(12) United States Patent
Wang et al.

(10) Patent No.: US 11,101,870 B2
(45) Date of Patent: Aug. 24, 2021

(54) COMMUNICATION PROCESSING METHOD AND DEVICE, AND UNMANNED AERIAL VEHICLE

(71) Applicant: SZ DJI TECHNOLOGY CO., LTD., Shenzhen (CN)

(72) Inventors: Naibo Wang, Shenzhen (CN); Yan Wang, Shenzhen (CN); Ying Chen, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/715,282

(22) Filed: Dec. 16, 2019

(65) Prior Publication Data

US 2020/0119803 A1 Apr. 16, 2020

Related U.S. Application Data

(63) Continuation of application No. PCT/CN2017/089710, filed on Jun. 23, 2017.

(51) Int. Cl.
| | |
|---|---|
| H04B 7/08 | (2006.01) |
| H04B 7/04 | (2017.01) |
| H04B 7/0404 | (2017.01) |
| H04B 7/185 | (2006.01) |

(52) U.S. Cl.
CPC ........ *H04B 7/0871* (2013.01); *H04B 7/0404* (2013.01); *H04B 7/0808* (2013.01); *H04B 7/0834* (2013.01); *H04B 7/18506* (2013.01)

(58) Field of Classification Search
None
See application file for complete search history.

(56) References Cited

U.S. PATENT DOCUMENTS

| | | | |
|---|---|---|---|
| 6,633,745 B1 | 10/2003 | Bethscheider | |
| 10,601,461 B1* | 3/2020 | Eaton | G01S 19/36 |
| 2002/0122393 A1* | 9/2002 | Caldwell | H04B 7/0811 |
| | | | 370/328 |
| 2009/0295635 A1 | 12/2009 | Smoot et al. | |
| 2018/0084105 A1* | 3/2018 | Hiscock | H04B 7/0408 |
| 2018/0213355 A1* | 7/2018 | Smith | G01S 13/878 |
| 2018/0227036 A1* | 8/2018 | Palenius | H04B 7/0814 |
| 2019/0072638 A1* | 3/2019 | Wang | H04W 4/029 |

FOREIGN PATENT DOCUMENTS

| | | | |
|---|---|---|---|
| CN | 1941987 A | | 4/2007 |
| CN | 101984571 A | | 3/2011 |
| CN | 102130715 A | | 7/2011 |
| CN | 104703240 A | * | 6/2015 |
| CN | 104703240 A | | 6/2015 |
| CN | 105556410 A | | 5/2016 |
| CN | 106537178 A | | 3/2017 |

OTHER PUBLICATIONS

The World Intellectual Property Organization (WIPO) International Search Report for PCT/CN2017/089710 dated Apr. 3, 2018 6 pages.

* cited by examiner

*Primary Examiner* — Pablo N Tran
(74) *Attorney, Agent, or Firm* — Anova Law Group, PLLC

(57) ABSTRACT

A method for communication processing includes determining a confidence level of an antenna system of a mobile device based on a measured result of the mobile device, determining a communication mode based on the confidence level, and using the communication mode for communication. The communication mode includes an antenna switching mechanism or a diversity mechanism.

18 Claims, 3 Drawing Sheets

COMMUNICATION PROCESSING METHOD AND DEVICE, AND UNMANNED AERIAL VEHICLE

CROSS REFERENCE TO RELATED APPLICATION

This application is a continuation of International Application No. PCT/CN2017/089710, filed on Jun. 23, 2017, the entire content of which is incorporated herein by reference.

TECHNICAL FIELD

The present disclosure relates to electronic equipment and, more particularly, to a method and an apparatus for communication processing, and an unmanned vehicle.

BACKGROUND

As communication technologies advance, mobile devices may be configured with a plurality of antennas to improve communication quality, especially in applications of video communication or image transmission, etc. However, when the mobile devices communicate, the mobile devices are constantly moving, which causes degradation in the communication quality between the mobile devices and receiving devices. For example, a mobile device may be a mobile robot or an unmanned vehicle. When the mobile robot or the unmanned vehicle moves, the mobile robot or the unmanned vehicle may change its relative position and angle correspondingly. A condition of a signal channel between the mobile robot or the unmanned vehicle and a receiving device may change relatively. Thus, how to improve the communication quality of the mobile devices is an urgent problem to be solved.

SUMMARY

In accordance with the disclosure, there is provided a method for communication processing including determining a confidence level of an antenna system of a mobile device based on a measured result of the mobile device, determining a communication mode based on the confidence level, and using the communication mode for communication. The communication mode includes an antenna switching mechanism or a diversity mechanism.

Also in accordance with the disclosure, there is provided an unmanned vehicle including an antenna system, a processor, and a memory coupled to the processor and storing instructions that, when executed by the processor, cause the processor to determine a confidence level of the antenna system based on a measured result of the unmanned vehicle, determine a communication mode based on the confidence level, and use the communication mode for communication. The communication mode includes an antenna switching mechanism or a diversity mechanism.

BRIEF DESCRIPTION OF THE DRAWINGS

To more clearly illustrate the technical solution of the present disclosure, the accompanying drawings used in the description of the disclosed embodiments are briefly described hereinafter. Obviously, the drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

Figure 1:
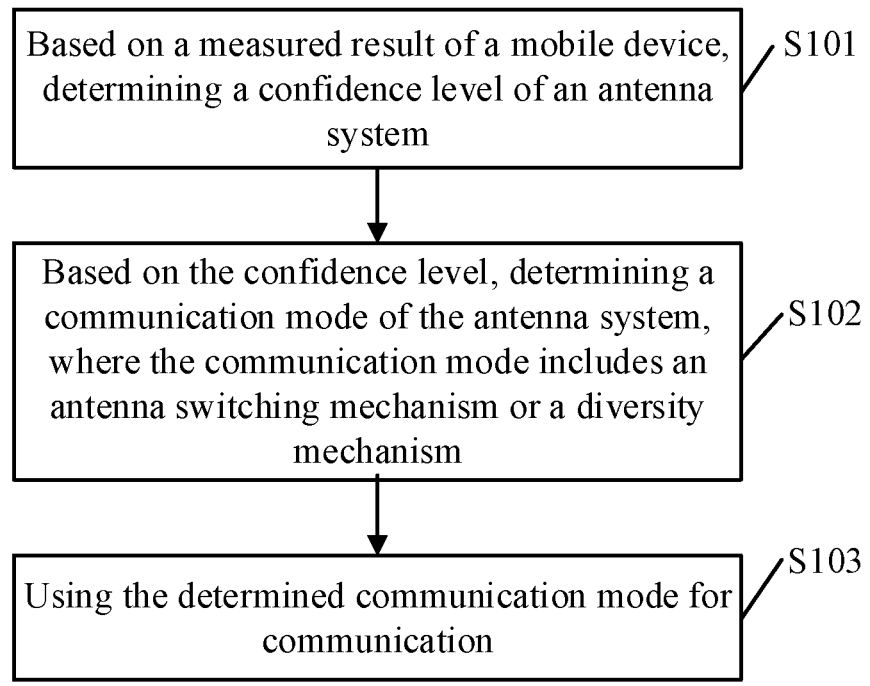
FIG. 1 is a flow chart of a method for communication processing according to an example embodiment.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

It should be noted that, in some embodiments, when one component is "fixedly connected" or "connected" to another component, or one component is "fixed" to another component, the component may directly contact the another component, or may not directly contact the another component and may have something in-between.

Unless otherwise specified, all the technical and scientific terms used in the embodiments of the present disclosure refer to the same meaning commonly understood by those skilled in the art. The terminologies used in the present disclosure are intended to describe specific embodiments, and not to limit the scope of the present disclosure. The term "and/or" includes any and all combinations of one or more of the listed items.

As communication technologies advance, mobile devices may be configured with a plurality of antennas to improve communication quality, especially in applications of video communication or image transmission, etc. However, when the mobile devices communicate, the mobile devices are constantly moving, which causes degradation in communication quality between the mobile devices and receiving devices. For example, a mobile device may be a mobile robot or an unmanned vehicle. When the mobile robot or the unmanned vehicle moves, the mobile robot or the unmanned vehicle may change its relative position and angle correspondingly. A condition of a signal channel between the mobile robot or the unmanned vehicle and a receiving device may change relatively. The present disclosure provides a method and an apparatus for communication processing, and an unmanned vehicle, in which communication modes are dynamically selected based on measured results to improve communication quality.

In some embodiments, the mobile device may determine a confidence level of an antenna system of the mobile device based on a measured result of the mobile device and may further determine a communication mode of the antenna system based on the confidence level. The communication mode may include an antenna switching mechanism or an antenna diversity mechanism. The mobile device may communicate in the determined communication mode and may dynamically select the communication mode based on the measured result to improve the communication quality.

In some embodiments, the measured result may include one or more of information of signal channel status of the antenna system, information of signal channel quality of the antenna system, status information of the mobile device, an angle of a maximum gain direction of the antenna system with respect to a device connection line, received power of the antenna system, and information of signal channel condition, etc.

In some embodiments, steps of the method may be implemented in a mobile terminal (e.g., smart phone) or in an unmanned vehicle. The unmanned vehicle may include an unmanned aircraft, an unmanned car, an unmanned marine vessel, and a robot, etc. The present disclosure does not limit the variations of the unmanned vehicle. For illustrative purposes, an unmanned aircraft is described as an example of the unmanned vehicle in the present disclosure.

The present disclosure provides a method and an apparatus for communication processing and an unmanned vehicle. The method may dynamically select a communication mode based on a measured result to improve the communication quality. The method will be described in detail in various embodiments of the present disclosure.

FIG. 1 is a flow chart of a method for communication processing according to an example embodiment. The method may be applied to a mobile device such as an unmanned vehicle. The mobile device may be configured with an antenna system that includes at least two antennas.

As shown in FIG. 1, at S101 a confidence level of an antenna system is determined based on a measured result of a mobile device.

In some embodiments, the mobile device may determine the confidence level of the antenna system based on the measured result.

The measured result may include one or more of information of signal channel status of the antenna system, information of signal channel quality of the antenna system, status information of the mobile device, an angle of a maximum gain direction of the antenna system with respect to a device connection line, received power of the antenna system, and information of signal channel condition, etc.

The confidence level may be one of indicators for measuring a change of communication state of the antenna system.

In some embodiments, executing S101 by the mobile device may include the following process. When the measured result includes at least one of the information of the signal channel status of the antenna system or the information of the signal channel quality of the antenna system, the mobile device may determine a first change rate of the measured result of the antenna system in a preset time interval. Based on the first change rate, the mobile device may determine the confidence level of the antenna system. The first change rate is inversely proportional to the confidence level.

For example, the mobile device may determine the first change rate of a transmission speed of the antenna system in the preset time interval. If the first change rate is 90 Kbit/s$^2$, the mobile device may determine the confidence level of the antenna system to be about 40 based on the first change rate. If the first change rate is 70 Kbit/s$^2$, the mobile device may determine the confidence level of the antenna system to be about 50 based on the first change rate.

The information of the signal channel status may also include a multi-path delay or a Doppler frequency shift, etc. The information of the signal channel quality may include a transmission speed, a signal channel bit error rate, or a signal to noise ratio, etc. Thus, the first change rate of the measured result of the antenna system in the preset time interval may include a change rate of one or more of the measured results including the data transmission speed of the antenna system, the multi-path delay, or the Doppler frequency shift, etc., in the preset time interval.

In some embodiments, when the measured result includes at least one of the information of the signal channel status of the antenna system or the information of the signal channel quality of the antenna system, the mobile device may determine the first change rate of the measured result of the antenna system in the preset time interval. Based on the first change rate, the mobile device may determine the confidence level of the antenna system. The first change rate is inversely proportional to the confidence level.

In other words, a greater first change rate indicates a faster change in the status of the mobile device, and hence it is more reliable for the mobile device to select the diversity mechanism for communication. As such, the confidence level of the antenna system obtained based on the first change rate is lower. On the other hand, a smaller first change rate indicates a slower change in the status of the mobile device, and hence it is more reliable for the mobile device to select the antenna switching mechanism for communication. As such, the confidence level of the antenna system obtained based on the first change rate is higher.

In some embodiments, when the mobile device performs S101, S101 may further include the following process. When the measured result includes the status information of the mobile device, the mobile device may determine a second change rate of the status information of the mobile device in the preset time interval. Based on the second change rate, the mobile device may determine the confidence level of the antenna system. The second change rate is inversely proportional to the confidence level.

For example, the mobile device may determine the second change rate of a moving speed of the mobile device in the preset time interval. If the second change rate is 30 m/s$^2$, the mobile device may determine the confidence level of the antenna system to be about 50 based on the second change rate. If the second change rate is 20 m/s$^2$, the mobile device may determine the confidence level of the antenna system to be about 60 based on the second change rate.

In some embodiments, when the measured result includes the status information of the mobile device, the mobile device may determine the second change rate of the status information of the mobile device in the preset time interval. Based on the second change rate, the mobile device may determine the confidence level of the antenna system. The second change rate is inversely proportional to the confidence level.

In other words, a greater second change rate indicates a faster change in the status of the mobile device, and hence it is more reliable for the mobile device to select the diversity mechanism for communication. As such, the confidence level of the antenna system obtained based on the second change rate is lower. On the other hand, a smaller second change rate indicates a slower change in the status of the mobile device, and hence it is more reliable for the mobile device to select the antenna switching mechanism for communication. As such, the confidence level of the antenna system obtained based on the second change rate is higher.

The status information of the mobile device may include a moving speed or an attitude of the mobile device. Thus, the second change rate of the status information of the mobile device in the preset time interval may include a change rate of the moving speed or the attitude of the mobile device in the preset time interval.

In some embodiment, the measured result may include the angle of the maximum gain direction of the antenna system with respect to the device connection line. The device connection line may be a line connecting the mobile device and an interacting device that interacts with the mobile device. Based on the angle of the maximum gain direction of the antenna system with respect to the device connection line, the mobile device may determine the confidence level of the antenna system. The angle is inversely proportional to the confidence level.

For example, the mobile device may obtain the angle of the maximum gain direction of the antenna system with respect to the device connection line. If the angle is 45°, the mobile device may determine the confidence level of the antenna system to be about 50 based on the angle of the maximum gain direction of the antenna system with respect to the device connection line. If the angle is 15°, the mobile device may determine the confidence level of the antenna system to be about 70 based on the angle of the maximum gain direction of the antenna system with respect to the device connection line.

In some embodiments, the measured result may include the angle of the maximum gain direction of the antenna system with respect to the device connection line. Based on the angle of the maximum gain direction of the antenna system with respect to the device connection line, the mobile device may determine the confidence level of the antenna system. The angle is inversely proportional to the confidence level.

In other words, a larger angle results in a weaker signal intensity that the interacting device receives, and hence it is more reliable for the mobile device to select the diversity mechanism for communication. As such, the confidence level of the antenna system obtained based on the angle is lower. On the other hand, a smaller angle results in a stronger signal intensity that the interacting device receives, and hence it is more reliable for the mobile device to select the antenna switching mechanism for communication. As such, the confidence level of the antenna system obtained based on the angle is higher.

In some embodiments, executing S101 by the mobile device may include the following process. When the measured result includes the received power of each of the at least two antennas, the mobile device may determine a difference between the received powers of different antennas of the at least two antennas. Based on the difference, the mobile device may determine the confidence level of the antenna system. The difference is proportional to the confidence level.

For example, if the mobile device determines that the difference between the received powers of different antennas of the at least two antennas is 40 dB, the mobile device may determine the confidence level of the antenna system to be about 85 based on the difference. If the mobile device determines that the difference between the received powers of different antennas of the at least two antennas is 20 dB, the mobile device may determine the confidence level of the antenna system to be about 70 based on the difference.

In some embodiments, the measured result may include the received powers of each of the at least two antennas. The mobile device may determine the difference between the received powers of different antennas of the at least two antennas. Based on the difference, the mobile device may determine the confidence level of the antenna system. The difference is proportional to the confidence level.

In other words, a greater difference between the received powers indicates that one of the at least two antennas has a greater received power, and hence it is more reliable for the mobile device to select the antenna switching mechanism. As such, the confidence level of the antenna system obtained based on the difference is higher. On the other hand, a smaller difference between the received powers indicates that the received powers of the at least two antennas differ less from each other, and hence it is more reliable for the mobile device to select the diversity mechanism. As such, the confidence level of the antenna system obtained based on the difference is lower.

In some embodiments, the mobile device may obtain the received power of each antenna as follows. The mobile device may transmit a reference signal to the interacting device that interacts with the mobile device. The mobile device may receive feedback information transmitted by the interacting device in response to the reference signal. The mobile device may determine the received powers of the at least two antennas based on the feedback information.

In some embodiments, the mobile device may transmit the reference signal to the interacting device that interacts with the mobile device. The mobile device may receive the feedback information transmitted by the interacting device in response to the reference signal. The mobile device may determine the received powers of the at least two antennas based on the feedback information. Thus, the mobile device may determine the confidence level of the antenna system based on the received powers.

In some embodiments, executing S101 by the mobile device may include the following process. When the measured result includes the information of the signal channel condition of each of the at least two antennas, the mobile device may determine a difference between the measured results of different antennas of the at least two antennas. Based on the difference, the mobile device may determine the confidence level of the antenna system. The difference is proportional to the confidence level.

For example, if the mobile device determines that the difference between the transmission delays of different antennas of the at least two antennas is 1 μs, the mobile device may determine the confidence level of the antenna system to be about 80 based on the difference. If the mobile device determines that the difference between the transmission delays of different antennas of the at least two antennas is 0.1 μs, the mobile device may determine the confidence level of the antenna system to be about 70 based on the difference.

In some embodiments, when the measured result includes the information of the signal channel condition, the mobile device may determine the difference between the measured results of different antennas of the at least two antennas. Based on the difference, the mobile device may determine the confidence level of the antenna system. The difference is proportional to the confidence level.

In other words, a greater difference between the measured results indicates that one of the at least two antennas has a better condition, and hence it is more reliable for the mobile device to select the antenna switching mechanism for communication. As such, the confidence level of the antenna system obtained based on the difference is higher. On the other hand, a smaller difference between the measured results indicates that the signal channel conditions of the at least two antennas differ less from each other, and hence it is more reliable for the mobile device to select the diversity mechanism for communication. As such, the confidence level of the antenna system obtained based on the difference is lower.

The information of the signal channel condition may include signal channel delay, signal channel signal-to-noise ratio, and signal channel transmission speed, etc.

At S102, the mobile device determines a communication mode of the antenna system based on the confidence level. The communication mode includes the antenna switching mechanism or the diversity mechanism.

In some embodiments, the mobile device may determine the communication mode of the antenna system based on the confidence level. The communication mode may include the antenna switching mechanism or the diversity mechanism.

In some embodiments, executing S102 by the mobile device may include the following process. When the confidence level is higher than a preset threshold, the mobile device may determine that the communication mode of the antenna system is the antenna switching mechanism. When the confidence level is lower than or equal to the preset threshold, the mobile device may determine that the communication mode of the antenna system is the diversity mechanism.

For example, if the preset threshold is 60 and the confidence level is 72, the mobile device may determine that the confidence level is higher than the preset threshold and the communication mode of the antenna system is the antenna switching mechanism. If the confidence level is 50, the mobile device may determine that the confidence level is lower than the preset threshold and the communication mode of the antenna system is the diversity mechanism.

In some embodiments, when the confidence level is higher than the preset threshold, the signal channel quality or the signal channel status of one of the at least two antennas may be good. The communication may be more reliable when the mobile device selects the antenna switching mechanism. Thus, it is determined that the communication mode of the antenna system is the antenna switching mechanism. When the confidence level is lower than or equal to the preset threshold, the signal channel quality or the signal channel status of the antenna system may be poor. If the mobile device selects the antenna switching mechanism, switching errors may occur in the communication. Thus, it is determined that the communication mode of the antenna system is the diversity mechanism. The communication mode may be dynamically selected to improve the communication quality.

The preset threshold may be dynamically configured based on the communication quality of the mobile device or application scenarios of the present disclosure. The preset threshold may be configured at the ex-factory time of the mobile device. The present disclosure does not limit when to configure the preset threshold.

In some embodiments, the mobile device may determine the preset threshold as follows. The mobile device may obtain the status information thereof. The status information may include change rates of the moving speed and the attitude of the mobile device. Based on the status information, the mobile device may determine the preset threshold.

For example, in a scenario with large maneuver or drastic attitude change, such as in the scenario of a traversing vehicle, e.g., a first person view (FPV) drone, the mobile device may obtain the change rate of the moving speed or the attitude thereof. Based on the change rate of the moving speed or the attitude, the mobile device may determine the preset threshold.

In other words, if the change rate of the moving speed or the attitude of the mobile device is relatively large, the mobile device may change the status rapidly. The communication may be more reliable when the mobile device selects the diversity mechanism. Thus, the preset threshold may be configured to be relatively large. If the change rate of the moving speed or the attitude of the mobile device is relatively small, the mobile device may change the status smoothly. The communication may be more reliable when the mobile device selects the antenna switching mechanism. Thus, the preset threshold may be configured to be relatively small.

For example, compared to an ordinary aircraft for aerial photography, the traversing vehicle may have a larger change rate of the moving speed or the attitude under a same condition of measuring results. Thus, the traversing vehicle may use a larger preset threshold (i.e., the confidence level threshold). In other words, the traversing vehicle may be more likely to select the diversity mechanism to be the communication mode of the antenna system and less likely to select the antenna switching mechanism to be the communication mode of the antenna system.

In some embodiments, the mobile device may obtain the status information of the mobile device. Based on the status information, the mobile device may determine the preset threshold and make the preset threshold dynamically adapt to various application scenarios.

The mobile device may obtain the status information of the mobile device by using sensors. The sensors may include a gravity sensor, a triaxial acceleration sensor, a gyroscope, and a vision sensor, etc.

At S103, the determined communication mode is used for communication.

In some embodiments, the mobile device may use the determined communication mode for communication to improve the communication quality.

For example, if the communication mode determined by the mobile device is the antenna switching mechanism, the mobile device may select an antenna having a desired signal channel quality from the antenna system for communication. If the communication mode determined by the mobile device is the diversity mechanism, the mobile device may select at least two antennas from the antenna system for communication.

In some embodiments, the diversity mechanism may include a time-switched transmit diversity (TSTD) mechanism, a space diversity mechanism, or a frequency diversity mechanism.

For example, the mobile device may use a space diversity mechanism based on Alamouti's space-time block code (STBC) to transmit data. The mechanism uses an orthogonal packet coding method to split the transmitting data into two paths and transmits the data separately using two antennas.

In another example, the mobile device may use the TSTD diversity mechanism to transmit the data. The mechanism transmits the data using different antennas at different timeslots. Because the timeslots are often short, the receiver may consider that a same antenna transmits the data. Thus, the use of the TSTD diversity mechanism is transparent to the receiver. That is, if the TSTD diversity mechanism is selected for communication, the complexity is low.

In some embodiments, the mobile device may determine the confidence level of the antenna system based on the measured result of the mobile device. Based on the confidence level, the mobile device may determine the communication mode of the antenna system. The communication mode may include the antenna switching mechanism or the diversity mechanism. The mobile device may use the determined communication mode for communication and may dynamically select the communication mode based on the measured result, thereby improving the communication quality.

Figure 2:
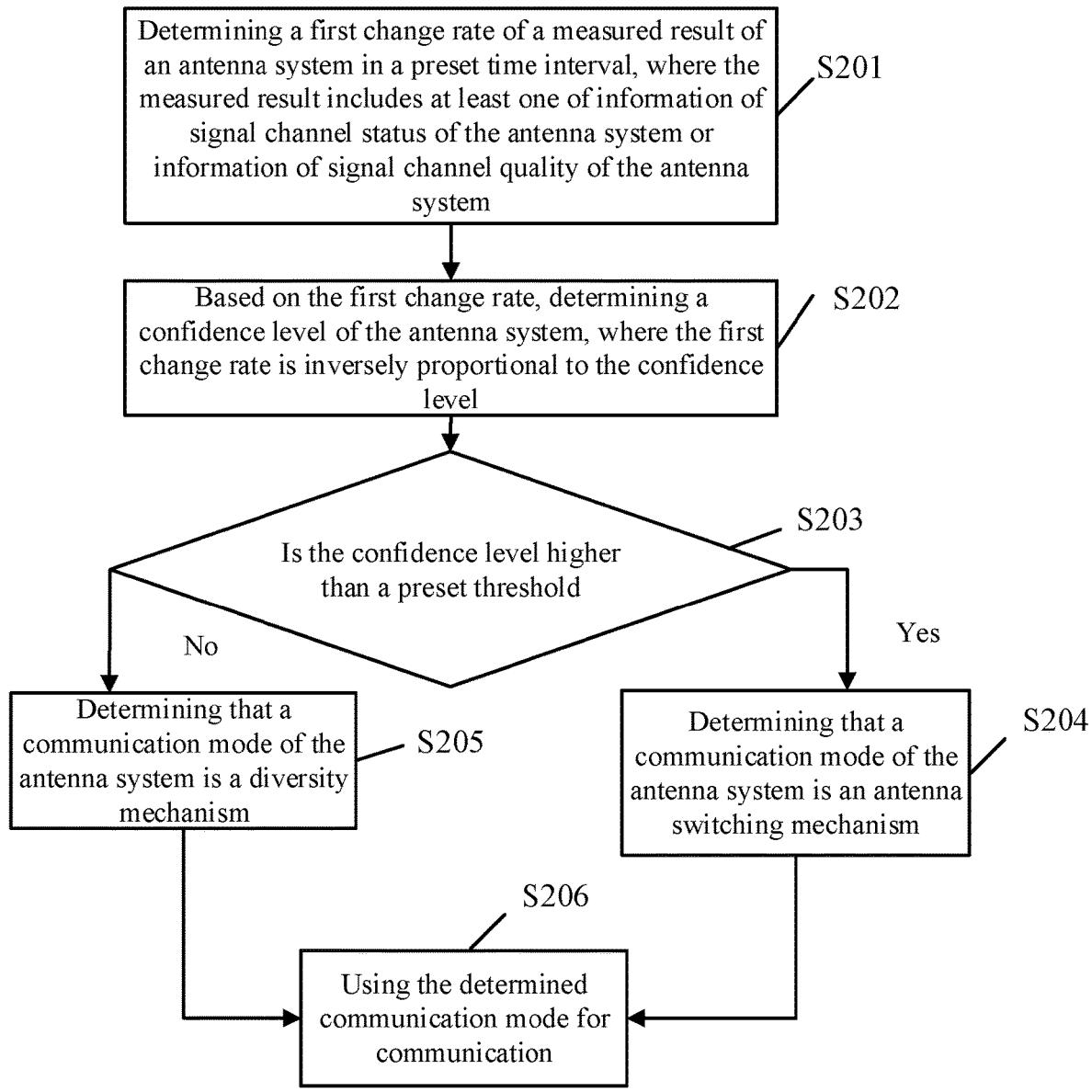
FIG. 2 is a flow chart of a method for communication processing according to another example embodiment.

FIG. 2 is a flow chart of a method for communication processing according to another example embodiment. The method may be applied to a mobile device, such as an unmanned vehicle. The mobile device may include an antenna system configured with at least two antennas. In the embodiments of the present disclosure, the method for communication process may include the following steps.

At S201, a first change rate of a measured result of an antenna system in a preset time interval is determined. The measured result may include at least one of information of signal channel status of the antenna system and information of signal channel quality of the antenna system.

In some embodiments, the mobile device may determine the first change rate of the measured result of the antenna system in the preset time interval and may determine a confidence level based on the first change rate.

The information of the signal channel status may include a multipath delay or a Doppler frequency shift, etc. The information of the signal channel quality may include a transmission speed, a signal channel bit error rate, or a signal-to-noise ratio, etc. Thus, the first change rate of the measured result of the antenna system in the preset time interval may include a change rate in the preset time interval of one or more of the measured results including a data transmission speed of the antenna system, a multipath delay, or a Doppler frequency shift.

At S202, a confidence level of the antenna system is determined based on the first change rate. The first change rate is inversely proportional to the confidence level.

In some embodiments, the mobile device may determine the confidence level of the antenna system based on the first change rate. In other words, a greater first change rate indicates a faster change in the status of the mobile device, and hence it is more reliable for the mobile device to select the diversity mechanism for communication. As such, the confidence level of the antenna system obtained based on the first change rate is lower. On the other hand, a smaller first change rate indicates a slower change in the status of the mobile device, and hence it is more reliable for the mobile device to select the antenna switching mechanism for communication. As such, the confidence level of the antenna system obtained based on the first change rate is higher.

For example, the mobile device may determine the first change rate of a moving speed of the mobile device in the preset time interval. If the first change rate is 30 m/s², the mobile device may determine the confidence level of the antenna system to be about 50 based on the first change rate. If the first change rate is 20 m/s², the mobile device may determine the confidence level of the antenna system to be about 60 based on the first change rate.

At S203, whether the confidence level is higher than a preset threshold is determined. If it is determined that the confidence level is higher than the preset threshold, S204 is executed. Otherwise S205 is executed.

At S204, it is determined that a communication mode of the antenna system is an antenna switching mechanism.

In some embodiments, the confidence level is higher than the preset threshold, which means the signal channel quality or the signal channel status of a certain antenna is good. In this situation, it is more reliable to select the antenna switching mechanism for communication. Thus, it can be determined that the communication mode of the antenna system is the antenna switching mechanism.

At S205, it is determined that the communication mode of the antenna system is a diversity mechanism.

In some embodiments, the confidence level is lower than or equal to the preset threshold, which means the signal channel quality or the signal channel status of the antenna system is poor. In this situation, if the antenna switching mechanism is adopted for communication, switching error may occur. Thus, it may be determined that the communication mode of the antenna system is the diversity mechanism. As such, communication mode can be dynamically selected, thereby improving the communication quality.

For example, if the preset threshold is 60 and the confidence level is 72, the mobile device may determine that the confidence level is higher than the preset threshold and the communication mode of the antenna system is the antenna switching mechanism. If the confidence level is 50, the mobile device may determine that the confidence level is lower than the preset threshold and the communication mode of the antenna system is the diversity mechanism.

At S206, the determined communication mode is used for communication.

In some embodiments, based on the change rate of the measured result of at least one of the information of the signal channel status of the antenna system or the information of the signal channel quality of the antenna system, the mobile device may determine the confidence level and may further determine the communication mode based on the confidence level. Based on the measured result, the mobile device may dynamically select the communication mode to improve the communication quality.

Figure 3:
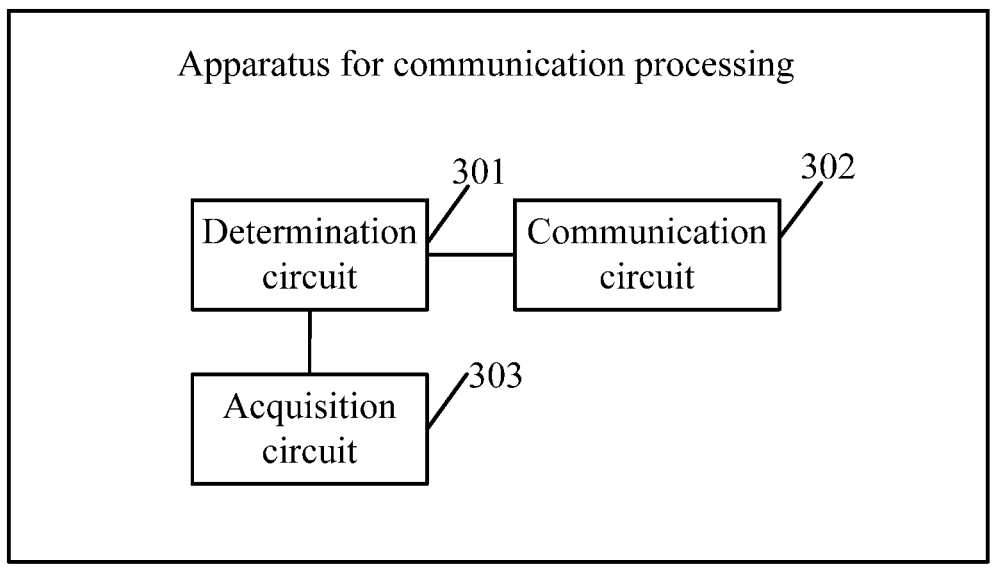
FIG. 3 is a schematic diagram of an apparatus for communication processing according to an example embodiment.

FIG. 3 is a schematic diagram of an apparatus for communication processing according to an example embodiment. The apparatus may be implemented in a mobile device. The mobile device may include an antenna system including at least two antennas. The mobile device may be an unmanned vehicle. As shown in FIG. 3, the apparatus for communication processing includes a determination circuit 301, a communication circuit 302, and an acquisition circuit 303.

The determination circuit 301 may be configured to determine a confidence level of the antenna system based on a measured result of the mobile device and to determine a communication mode of the antenna system based on the confidence level. The communication mode may include an antenna switching mechanism or a diversity mechanism.

The communication circuit 302 may be configured to use the determined communication mode for communication.

In some embodiments, the determination circuit 301 may be configured to determine that the communication mode of the antenna system is the antenna switching mechanism when the confidence level is higher than a preset threshold and to determine that the communication mode of the antenna system is the diversity mechanism when the confidence level is lower than or equal to the preset threshold.

In some embodiments, when the measured result includes at least one of the information of the signal channel status or the information of the signal channel quality of the antenna system, the determination circuit 301 may determine a first change rate of the measured result of the antenna system in a preset time interval. Based on the first change rate, the determination circuit 301 may determine a confidence level of the antenna system. The first change rate is inversely proportional to the confidence level.

In some embodiments, the first change rate of the measured result of the antenna system in the preset time interval may include a change rate of the measured result in the preset time interval including one or more of a data transmission speed, a multipath delay, or a Doppler frequency shift of the antenna system.

In some embodiments, when the measured result includes status information of the mobile device, the determination circuit 301 may determine a second change rate of the status information of the mobile device in the preset time interval.

Based on the second change rate, the determination circuit 301 may determine the confidence level of the antenna system. The second change rate is inversely proportional to the confidence level.

In some embodiments, the second change rate of the status information of the mobile device in the preset time interval may include a change rate of a moving speed or an attitude of the mobile device in the preset time interval.

In some embodiments, the measured result may include an angle between a maximum gain direction of the antenna system and a device connection line. The device connection line may be a line connecting the mobile device and an interacting device that interacts with the mobile device. Based on the angle of the maximum gain direction of the antenna system with respect to the device connection line, the determination circuit 301 may determine the confidence level of the antenna system. The angle is inversely proportional to the confidence level.

In some embodiments, when the measured result includes a received power of each of at least two antennas, the determination circuit 301 may determine a difference between the received powers of different antennas of the at least two antennas. Based on the difference, the determination circuit 301 may determine the confidence level of the antenna system. The difference is proportional to the confidence level.

In some embodiments, when the measured result includes information of signal channel condition of each of the at least two antennas, the determination circuit 301 may determine a difference between the measured results of different antennas of the at least two antennas. Based on the difference, the determination circuit 301 may determine the confidence level of the antenna system. The difference is proportional to the confidence level.

In some embodiments, the acquisition circuit 303 may be configured to obtain the status information of the mobile device. The status information of the mobile device may include the change rate of the moving speed or the attitude of the mobile device in the preset time interval.

In some embodiments, the determination circuit 301 may determine the preset threshold based on the status information.

In some embodiments, the mobile device may determine the confidence level of the antenna system based on the measured result of the mobile device. Based on the confidence level, the mobile device may determine the communication mode of the antenna system. The communication mode may include the antenna switching mechanism or the diversity mechanism. The mobile device may use the determined communication mode for communication. Based on the measured result, the mobile device may dynamically select the communication mode to improve the communication quality.

Figure 4:
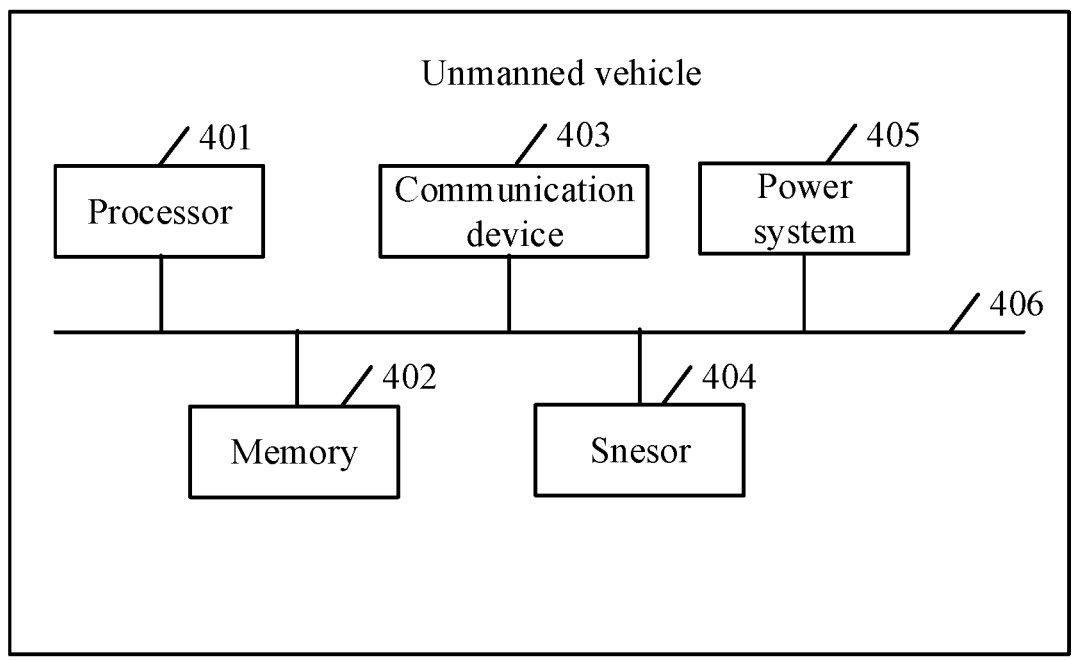
FIG. 4 is a schematic diagram of an unmanned vehicle according to an example embodiment.

FIG. 4 is a schematic diagram of an unmanned vehicle according to an example embodiment. In some embodiments, as shown in FIG. 4, the unmanned vehicle includes at least one processor 401 (e.g., a CPU), at least one memory 402, a communication device 403, a sensor 404, and a power system 405. The at least one processor 401, the at least one memory 402, the communication device 403, the sensor 404, the power system 405 may be connected through a bus 406. In some embodiments, the unmanned vehicle may be an unmanned aircraft.

The power system 405 may supply power for flying the unmanned aircraft. The communication device 403 may transmit and receive information.

The sensor 404 may obtain status information of the unmanned vehicle, such as a moving speed or an attitude information. In particular, the sensor 404 may be a gravity sensor, a triaxial acceleration sensor, a gyroscope, or a vision sensor, etc.

The at least one memory 402 may store program instructions. The at least one processor 401 may retrieve the program instructions stored in the at least one memory 402.

In some embodiments, the at least one processor 401 may the retrieve and execute the program instructions stored in the at least one memory 402 to perform the following processes.

Based on a measured result, the at least one processor 401 may determine a confidence level of an antenna system. Based on the confidence level, the at least one processor 401 may determine a communication mode of the antenna system. The communication mode may include an antenna switching mechanism or a diversity mechanism. The at least one processor 401 may use the determined communication mode for communication.

In some embodiments, the at least one processor 401 may further retrieve and execute the program instructions stored in the at least one memory 402 to perform the following processes.

When the confidence level is higher than a preset threshold, the at least one processor 401 may determine that the communication mode of the antenna system is the antenna switching mechanism. When the confidence level is lower than or equal to the preset threshold, the at least one processor 401 may determine that the communication mode of the antenna system is the diversity mechanism.

In some embodiments, when the measured result includes at least one of information of signal channel status of the antenna system or information of signal channel quality of the antenna system, the at least one processor 401 may further retrieve and execute the program instructions stored in the at least one memory 402 to perform the following processes.

The at least one processor 401 may determine a first change rate of the measured result of the antenna system in a preset time interval. Based on the first change rate, the at least one processor 401 may determine the confidence level of the antenna system. The first change rate is inversely proportional to the confidence level.

In some embodiments, the first change rate of the measured result of the antenna system in the preset time interval may include a change rate of the measured result in the preset time interval including one or more of a data transmission speed, a multipath delay, or a Doppler frequency shift.

In some embodiments, when the measured result includes the status information of the unmanned vehicle, the at least one processor 401 may further retrieve and execute the program instructions stored in the at least one memory 402 to perform the following processes.

The at least one processor 401 may determine a second change rate of the status information of the unmanned vehicle in the preset time interval. Based on the second change rate, the at least one processor 401 may determine the confidence level of the antenna system. The second change rate is inversely proportional to the confidence level.

In some embodiments, the second change rate of the status information of the unmanned vehicle in the preset time interval may include a change rate of the moving speed or the attitude of the unmanned vehicle in the preset time interval.

In some embodiments, when the measured result includes an angle of a maximum gain direction of the antenna system with respect to a device connection line, where the device connection line is a line connecting the unmanned vehicle and an interacting device that interacts with the unmanned vehicle, the at least one processor 401 may further retrieve and execute the program instructions stored in the at least one memory 402 to perform the following processes.

Based on the angle of the maximum gain direction of the antenna system with respect to the device connection line, the at least one processor 401 may determine the confidence level of the antenna system. The angle is inversely proportional to the confidence level.

In some embodiments, when the measured result includes a received power of each of at least two antennas, the at least one processor 401 may further retrieve and execute the program instructions stored in the at least one memory 402 to perform the following processes.

The at least one processor 401 may determine a difference between the received powers of different antennas of the at least two antennas. Based on the difference, the at least one processor 401 may determine the confidence level of the antenna system. The difference is proportional to the confidence level.

In some embodiments, when the measured result includes information of signal channel condition of each of the at least two antennas, the at least one processor 401 may further retrieve and execute the program instructions stored in the at least one memory 402 to perform the following processes.

The at least one processor 401 may determine a difference between the measured results of different antennas of the at least two antennas. Based on the difference, the at least one processor 401 may determine the confidence level of the antenna system. The difference is proportional to the confidence level.

In some embodiments, the at least one processor 401 may further retrieve and execute the program instructions stored in the at least one memory 402 to perform the following processes.

The at least one processor 401 may obtain the status information of the unmanned vehicle. The status information of the unmanned vehicle may include a change rate of the moving speed or the attitude of the unmanned vehicle in the preset time interval. Based on the status information, the at least one processor 401 may determine the preset threshold.

In the embodiments of the present disclosure, the mobile device may include the unmanned vehicle or the smart phone, etc.

In the embodiments of the present disclosure, the unmanned vehicle may determine the confidence level of the antenna system based on the measured result of the unmanned vehicle and may determine the communication mode of the antenna system based on the confidence level. The communication mode may include the antenna switching mechanism or the diversity mechanism. The unmanned vehicle may use the determined communication mode for communication. Based on measured result, the unmanned vehicle may dynamically select the communication mode, thereby improving the communication quality.

In various embodiments of the present disclosure, for brevity of illustrations, a series of action combinations are often described. However, those skilled in the art should understand that the present disclosure is not limited by the described action sequence. Certain steps may be performed in other sequences or concurrently in accordance with the present disclosure. The sequence numbers of the processes have nothing to do with the order of execution sequence. Instead, the order of executing the processes should be determined by functions and intrinsic logics. The sequence numbers should not limit the implementation of the embodiments of the present disclosure.

Further, the skilled in the art should also understand that the embodiments described in the specification are all preferred embodiments, and the actions and circuits involved are not necessarily required by the present disclosure.

The embodiments of the present disclosure may be implemented entirely or partially by software, hardware, firmware, or any combination thereof. When implemented in software, the embodiments of the present disclosure may be implemented entirely or partially in the form of a computer program product. The computer program product may include one or more computer program instructions. Executing the computer program instructions on a computer may entirely or partially produce the flow chart process or functions according to the embodiments of the present disclosure. The computer may be a general purpose computer, a specialized computer, a computer network, or other programmable devices. The computer program instructions may be stored in a computer readable storage medium or may be transferred from one computer readable storage medium to another computer readable storage medium. For example, the computer program instructions may be transferred from one network node, one computer, one server, or one data center to another network node, another computer, another server, or another data center through a wireline (e.g., coaxial cable, optical fiber, digital subscriber line) or wireless (e.g., infrared, radio, microwave, etc.) communication method. The computer readable storage medium may include any computer accessible usable medium or one or more of data storage equipment such as usable medium integrated servers or data centers. The usable medium may include a magnetic medium (e.g., a floppy disk, a hard disk, a magnetic tape), or a semiconductor medium (e.g., solid state disk), etc.

The foregoing descriptions are merely some implementation manners of the present disclosure, but the scope of the present disclosure is not limited thereto. Any change or replacement that can be conceived by a person skilled in the art based on the technical scope disclosed by the present application should be covered by the scope of the present disclosure. A true scope and spirit of the invention is indicated by the following claims.

What is claimed is:

1. A method for communication processing comprising:
    obtaining an angle between a maximum gain direction of an antenna system of a mobile device and a device connection line, the device connection line being a line connecting the mobile device and an interacting device that interacts with the mobile device;
    determining a confidence level of the antenna system of the mobile device based on the angle, the angle being inversely proportional to the confidence level;
    determining a communication mode based on the confidence level, the communication mode including an antenna switching mechanism or a diversity mechanism; and
    using the communication mode for communication.

2. The method of claim 1, wherein determining the communication mode based on the confidence level includes:

determining that the communication mode of the antenna system includes the antenna switching mechanism in response to the confidence level being higher than a preset threshold; or determining that the communication mode of the antenna system includes the diversity mechanism in response to the confidence level being lower than or equal to the preset threshold.

3. The method of claim 2, further comprising:

obtaining status information of the mobile device, the status information including a change rate of at least one of a moving speed or an attitude of the mobile device; and determining the preset threshold based on the status information.

4. An unmanned vehicle comprising:

an antenna system;

a processor; and a memory coupled to the processor and storing instructions that, when executed by the processor, cause the processor to:

obtain an angle between a maximum gain direction of the antenna system and a device connection line, the device connection line being a line connecting the unmanned vehicle and an interacting device that interacts with the unmanned vehicle;

determine a confidence level of the antenna system based on the angle, the angle being inversely proportional to the confidence level;

determine a communication mode based on the confidence level, the communication mode including an antenna switching mechanism or a diversity mechanism; and use the communication mode for communication.

5. The unmanned vehicle of claim 4, wherein the instructions further cause the processor to determine the communication mode based on the confidence level by:

determining that the communication mode of the antenna system includes the antenna switching mechanism in response to the confidence level being higher than a preset threshold; or determining that the communication mode of the antenna system includes the diversity mechanism in response to the confidence level being lower than or equal to the preset threshold.

6. The unmanned vehicle of claim 5, wherein the instructions further cause the processor to:

obtain status information of the unmanned vehicle, the status information including a change rate of at least one of a moving speed or an attitude of the unmanned vehicle; and determine the preset threshold based on the status information.

7. A method for communication processing comprising:

determining a confidence level of an antenna system of a mobile device based on a measured result of the mobile device;

obtaining a change rate of at least one of a moving speed or an attitude of the mobile device;

determining a threshold based on the change rate;

determining a communication mode based on the confidence level and the threshold, the communication mode including an antenna switching mechanism or a diversity mechanism; and using the communication mode for communication.

8. The method of claim 7, wherein determining the threshold based on the change rate includes:

dynamically changing the threshold based on the change rate.

9. The method of claim 7, wherein the threshold is positively related to the change rate.

10. The method of claim 7, wherein determining the communication mode based on the confidence level and the threshold includes:

determining that the communication mode of the antenna system includes the antenna switching mechanism in response to the confidence level being higher than the threshold.

11. The method of claim 7, wherein determining the communication mode based on the confidence level and the threshold includes:

determining that the communication mode of the antenna system includes the diversity mechanism in response to the confidence level being lower than or equal to the threshold.

12. The method of claim 7, wherein:

the measured result includes at least one of information of signal channel status of the antenna system or information of signal channel quality of the antenna system; and determining the confidence level based on the measured result includes:

determining a change rate of the measured result in a preset time interval; and determining the confidence level of the antenna system based on the change rate, the change rate being inversely proportional to the confidence level.

13. The method of claim 12, wherein the change rate of the measured result includes a change rate of at least one of a measured data transmission speed of the antenna system, a measured multipath delay, or a measured Doppler frequency shift in the preset time interval.

14. The method of claim 7, wherein:

the measured result includes status information of the mobile device; and determining the confidence level based on the measured result includes:

determining a change rate of the status information in a preset time interval; and determining the confidence level of the antenna system based on the change rate, the change rate being inversely proportional to the confidence level.

15. The method of claim 14, wherein the change rate of the status information includes the change rate of the moving speed or the attitude of the mobile device in the preset time interval.

16. The method of claim 7, wherein:

the measured result includes an angle between a maximum gain direction of the antenna system and a device connection line, the device connection line being a line connecting the mobile device and an interacting device that interacts with the mobile device; and determining the confidence level based on the measured result includes determining the confidence level of the antenna system based on the angle, the angle being inversely proportional to the confidence level.

17. The method of claim 7, wherein:

the antenna system includes two antennas;

the measured result includes a received power of each of the two antennas; and determining the confidence level based on the measured result includes:

determining a difference between the received powers of the two antennas; and determining the confidence level of the antenna system based on the difference, the difference being proportional to the confidence level.

18. The method of claim 7, wherein:
the antenna system includes two antennas;
the measured result includes information of signal channel condition of each of the two antennas; and
determining the confidence level based on the measured result includes:
   determining a difference between the information of signal channel condition of the two antennas; and
   determining the confidence level of the antenna system based on the difference, the difference being proportional to the confidence level.

* * * * *